(12) United States Patent
Kuhl

(10) Patent No.: US 6,183,047 B1
(45) Date of Patent: *Feb. 6, 2001

(54) WHEEL RIM TOP COVER

(75) Inventor: David Kuhl, Quincy, IL (US)

(73) Assignee: Titan Wheel International, Inc., Quincy, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/896,992

(22) Filed: Jul. 18, 1997

(51) Int. Cl.$^7$ ...................................................... B60B 21/02
(52) U.S. Cl. ................................. 301/97; 29/894.35
(58) Field of Search ................... 301/58, 95, 96, 301/97, 98, 110.5; 29/894.35, 894.354; 152/381.3, 381.4, 381.5

(56) References Cited

U.S. PATENT DOCUMENTS

| | | | | |
|---|---|---|---|---|
| 2,028,536 | * | 1/1936 | Eksergian | 152/381.3 |
| 2,083,325 | * | 6/1937 | Farr | 301/97 X |
| 2,126,222 | * | 8/1938 | Schwinn | 301/97 |
| 2,126,223 | * | 8/1938 | Schwinn | 301/97 |
| 3,008,770 | * | 11/1961 | Mueller | 301/97 |
| 4,266,417 | * | 5/1981 | Imamura et al. | 29/894.354 |

FOREIGN PATENT DOCUMENTS

| | | | | |
|---|---|---|---|---|
| 484183 | * | 7/1936 | (GB) | 301/97 |
| 450998 | * | 8/1949 | (IT) | 301/98 |

* cited by examiner

*Primary Examiner*—Russell D. Stormer
(74) *Attorney, Agent, or Firm*—Daniel A. Rosenberg; Kent A. Herink; Davis, Brown Law Firm

(57) ABSTRACT

A wheel rim including a first wheel rim section having a base and a pair of circumferential support flanges at opposite sides of the base, each of which extends radially outwardly from said base. A second wheel rim section has a base and a pair of circumferential support flanges at opposite sides of the base, each of which curves axially and radially outwardly. The second wheel rim section is sized to fit inside the first wheel rim section with the bases of the respective wheel rim sections in contact engagement. The outer peripheral edges of the flanges of both rim sections meet along the circumference of the wheel rim and are joint together by weldments that extend around the entire circumference of the wheel. The result is a composite wheel rim having an inner contour of a conventional roll-formed wheel rim and an outer, distinct contour. In an alternative embodiment, a composite wheel rim is formed of an extrusion having a cross section corresponding generally to the cross section of the joined two wheel rim sections of the preferred embodiment.

3 Claims, 7 Drawing Sheets

WHEEL RIM TOP COVER

BACKGROUND OF THE INVENTION

1. Field of the Invention

The present invention relates generally to wheel rims and, more specifically, to a wheel rim that has a top cover to provide added strength to the wheel rim.

2. Background of the Art

Wheel rims made from rolled and welded steel or aluminum are common. Sheet stock of the metal is cut in a generally rectangular shape to the appropriate length and width dimensions. The metal blank is then formed into a closed circle and the formerly opposing ends are butt welded together. The metal circle or tube is then roll-formed to create the desired profile of the wheel rim for retaining the tire, any inner tube, anchoring spokes if used, and the like. Because the wheel rim is formed of a single sheet, the strength of the wheel rim is determined largely from the thickness of the metal selected for use in the manufacture of the wheel. While heavier stock can be used to increase the strength of the wheel rim, forming of the heavier material may require different, stronger machines and tools at a significantly higher cost. There is a need, accordingly, for a roll-formed wheel rim that has added strength without using a heavier stock of material and that can be manufactured using standard roll-forming machines and tools.

SUMMARY OF THE INVENTION

The invention consists of a wheel rim including a first wheel rim section having a base and a pair of circumferential support flanges at opposite sides of the base, each of which extends radially outwardly from said base. A second wheel rim section has a base and a pair of circumferential support flanges at opposite sides of the base, each of which curves axially and radially outwardly. The second wheel rim section is sized to fit inside the first wheel rim section with the bases of the respective wheel rim sections in contact engagement. The outer peripheral edges of the flanges of both rim sections meet along the circumference of the wheel rim and are joint together by weldments that extend around the entire circumference of the wheel. The result is a composite wheel rim having an inner contour of a conventional roll-formed wheel rim and an outer, distinct contour. In an alternative embodiment, a composite wheel rim is formed of an extrusion having a cross section corresponding to the cross section of the joined two wheel rim sections of the preferred embodiment. A straight section of the extrusion is cut to length and rolled into a circle or tube. The formerly opposing ends are then butt welded together to form a wheel rim having strength and contours corresponding substantially to that of the preferred embodiment wheel rim.

An object of the present invention is to provide a wheel rim of standard stock material using standard machinery and tools but having an increased strength.

Another object of the invention is to provide a wheel rim having an inner, conventional contour for supporting a tire but having an outer, distinct profile for adding strength to the composite wheel rim.

A further object of the invention is to provide a composite wheel rim formed of an extrusion to provide a wheel rim having an inner, conventional contour for supporting a tire but having an outer, distinct profile for adding strength to the composite wheel rim.

These and other objects of the invention will be made apparent to those of skill in the art upon a review and understanding of this specification, the associated drawings, and appended claims.

BRIEF DESCRIPTION OF THE DRAWINGS

FIG. 8 is an enlarged view of the wheel of FIG. 3a.

DETAILED DESCRIPTION OF PREFERRED EMBODIMENTS

Figure 1:
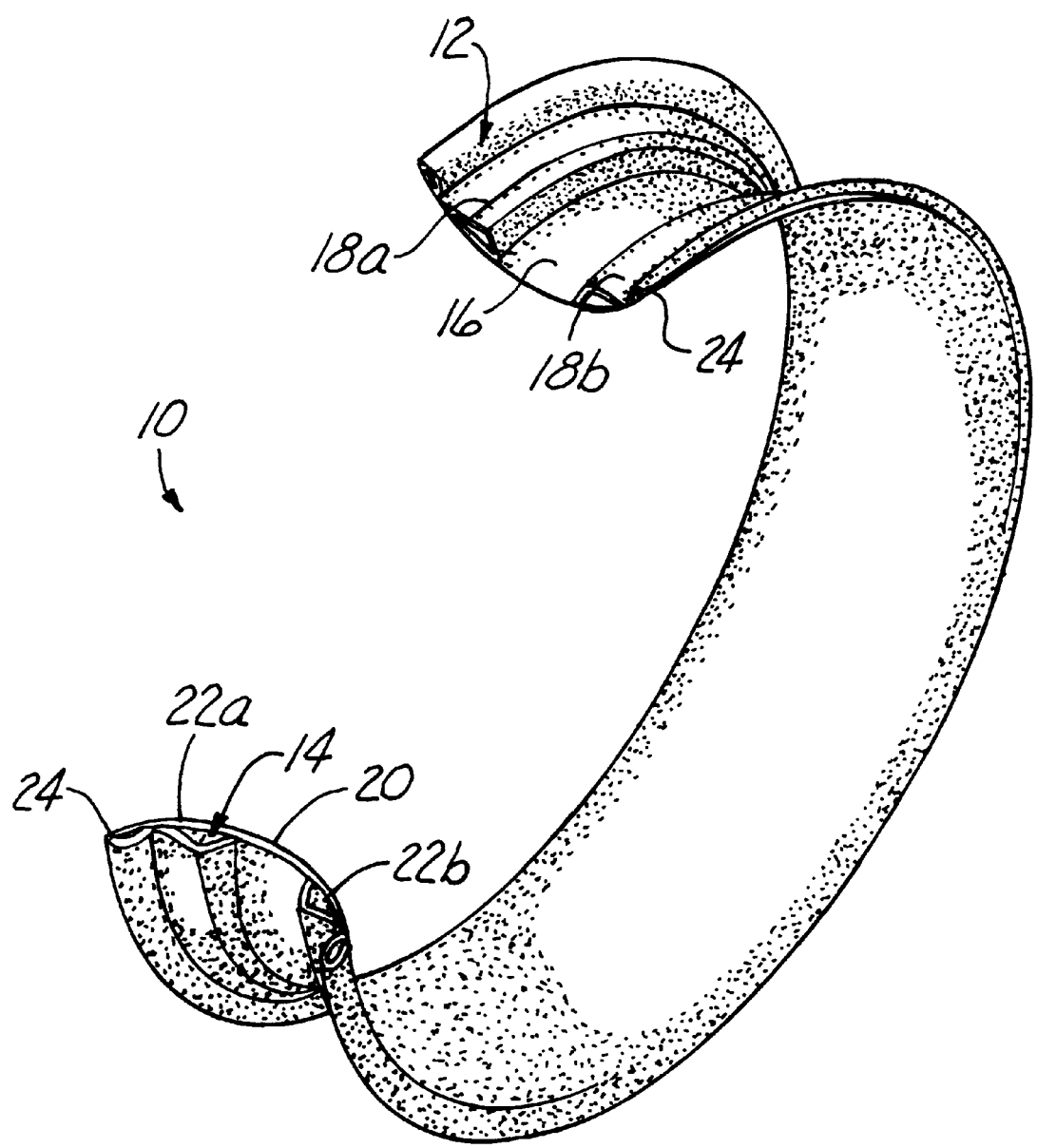
FIG. 1 is a perspective view of a wheel rim of the present invention with a section broken away to show the rim in cross section.

Illustrated in FIG. 1, generally at 10, is a wheel rim of the present invention. The wheel rim 10 includes a pair of wheel rim sections, a first wheel rim section 12 and a second wheel rim section 14. The first wheel rim section 12 has a base 16 and a pair of circumferential support flanges 18a and 18b each of which extends radially outwardly from opposite sides of the base 16. The second wheel rim section 14 has a base 20 and a pair of circumferential support flanges 22a and 22b each of which curves axially and radially outwardly from opposite sides of the base 20. The second wheel rim section 14 is sized to fit inside the first wheel rim section 12 such that the outer perimeter of the base 16 of the first wheel rim section 12 is in contact engagement with the inner perimeter of the base 20 of the second wheel rim section 14. The outer peripheral edge of the flanges 18a and 18b meet along the entire circumference of the wheel rim 10 with the outer peripheral edge of the flanges 22a and 22b. In a preferred embodiment, the flanges 18a and 22a are joined by weldments 24 or the like, and similarly the flange 18b is joined to the flange 22b to form a composite wheel rim having an inner contour of a conventional roll-formed wheel rim and an outer, distinct contour as represented by the outwardly facing contour of the second wheel rim section 14.

Figure 2:
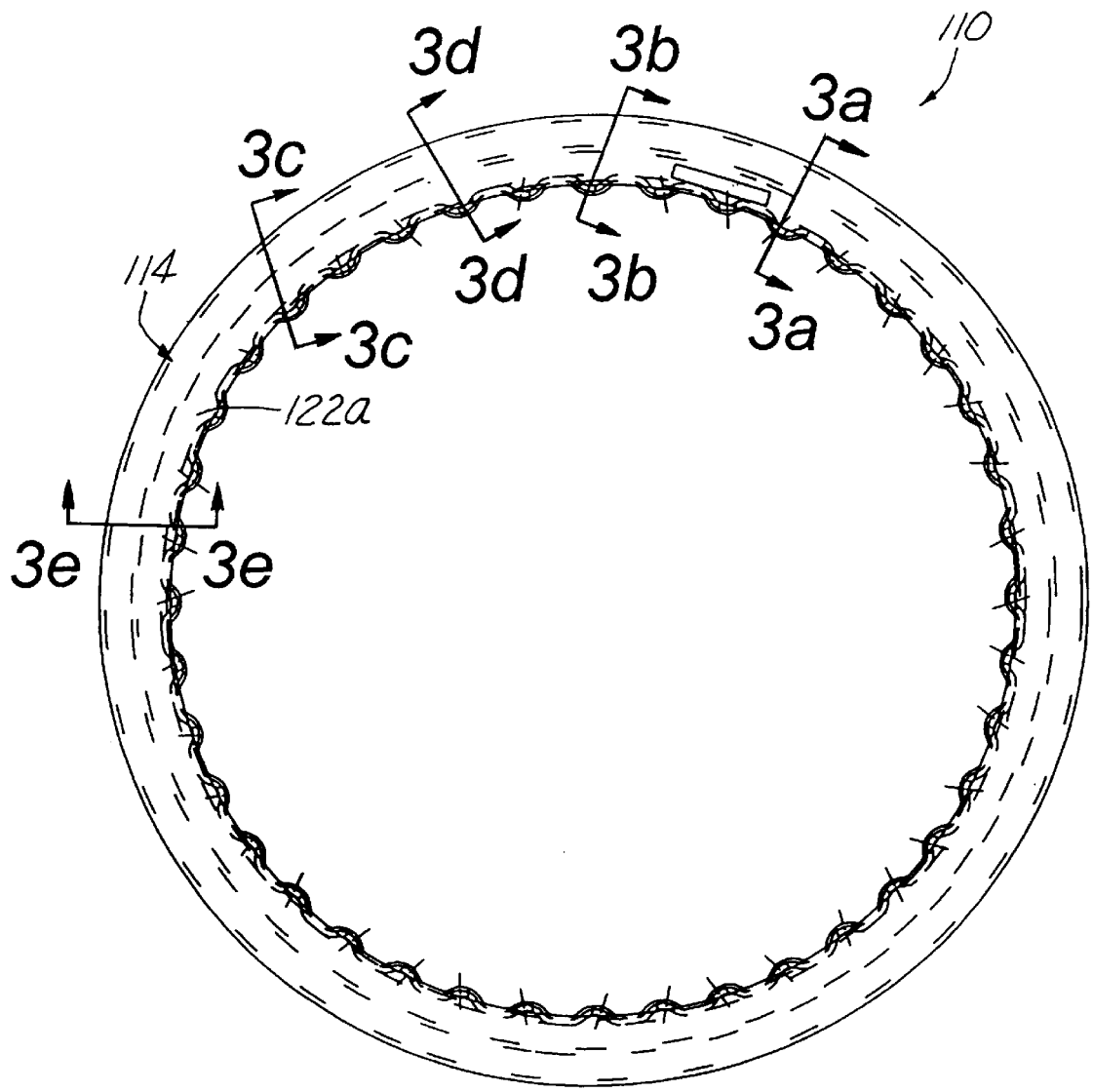
FIG. 2 is a side elevational view of a wheel rim of the present invention formed of steel.
Figure 3A:
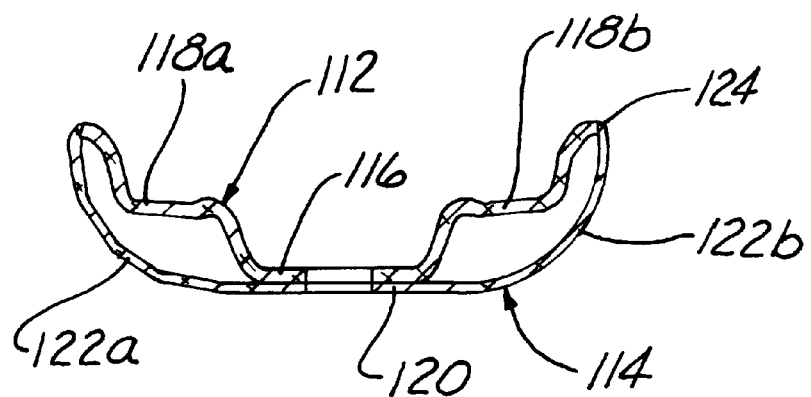
FIGS. 3a–e are cross sectional views of the wheel of FIG. 2 taken along the lines 3a–e.
Figure 3B:
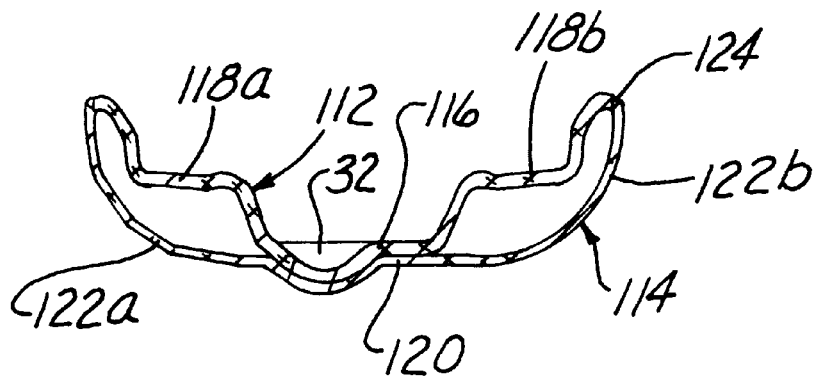
Figure 3C:
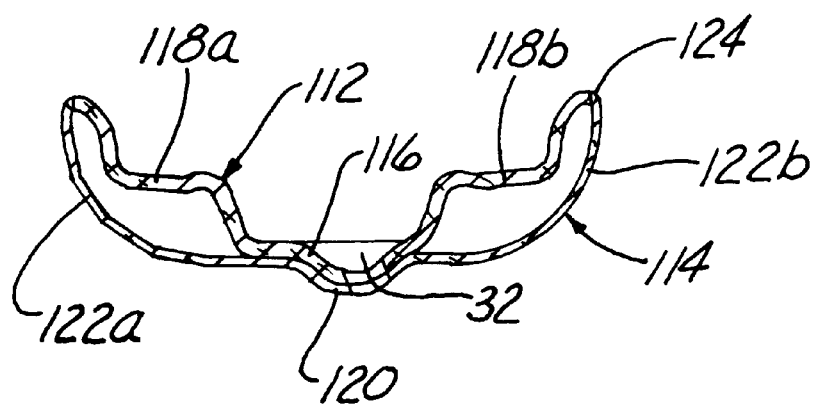
Figure 3D:
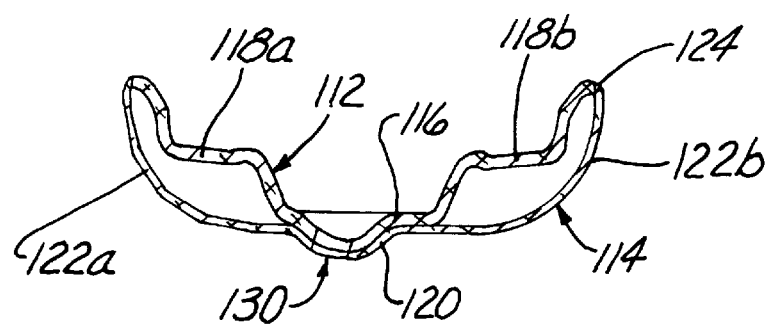
Figure 3E:
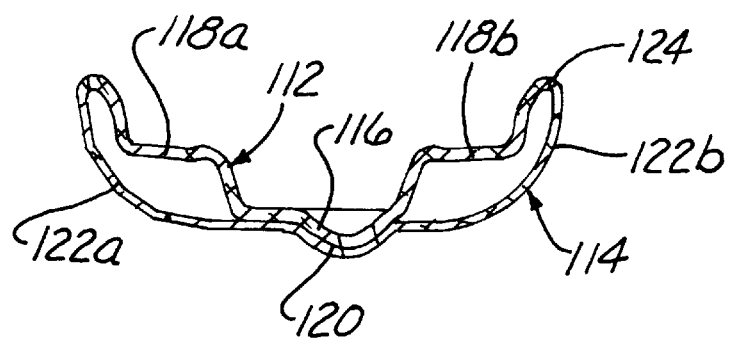
Figure 4:
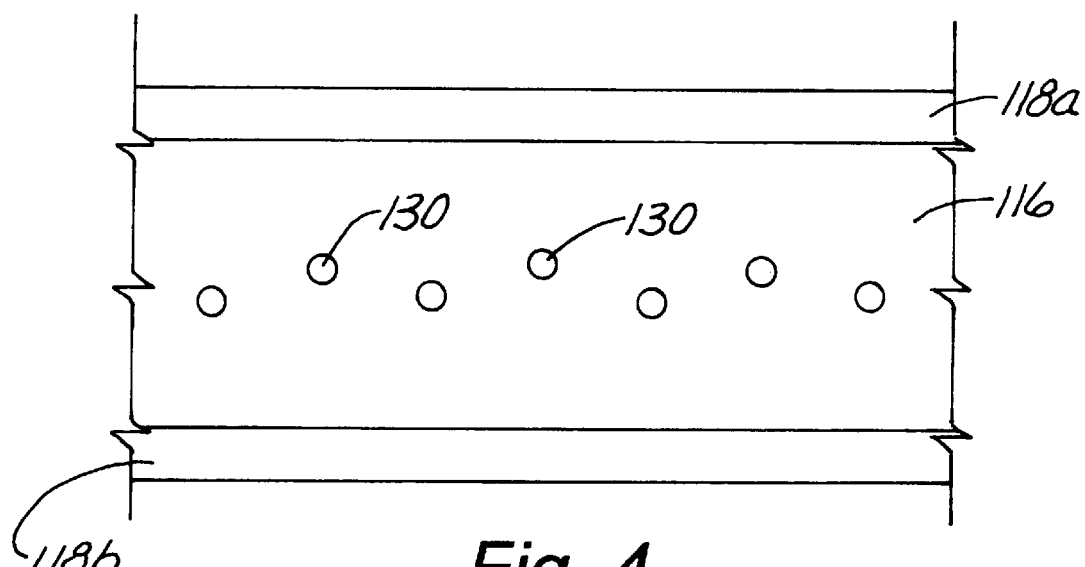
FIG. 4 is an enlarged detail plan view of the wheel rim of FIG. 2.
Figure 5:
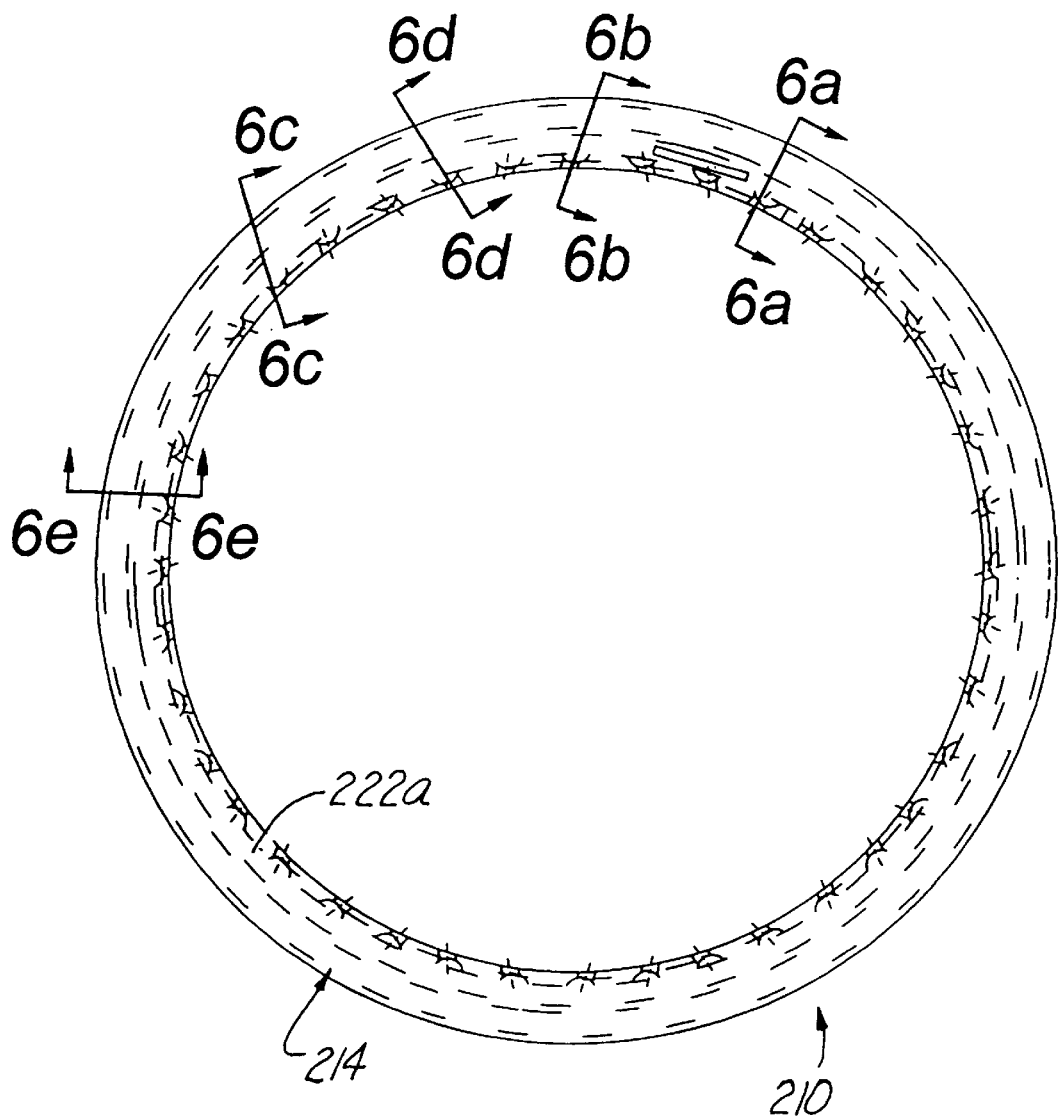
FIG. 5 is a side elevational view of a wheel rim of the present invention manufactured of aluminum.
Figure 6A:
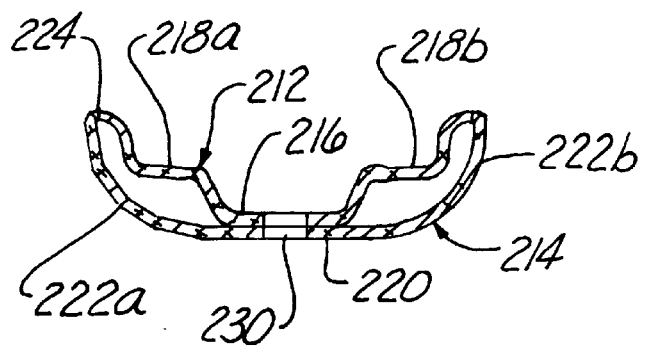
FIGS. 6a–e are cross sectional views of the wheel rim of FIG. 5 taken along lines 6a–e thereof.
Figure 6B:
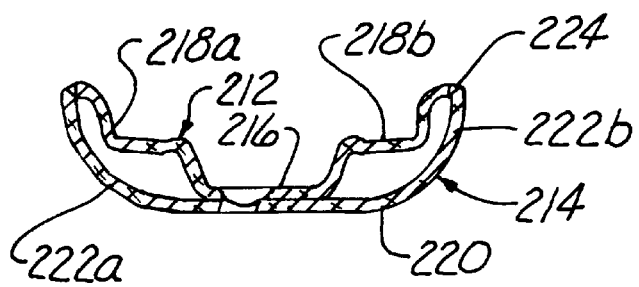
Figure 6C:
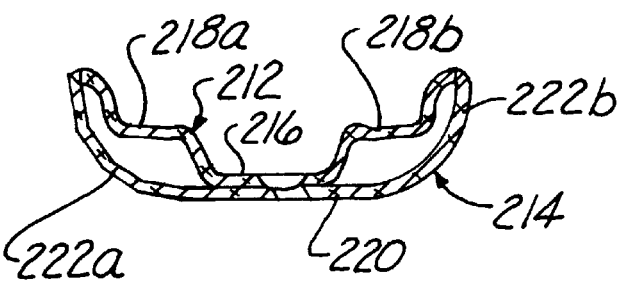
Figure 6D:
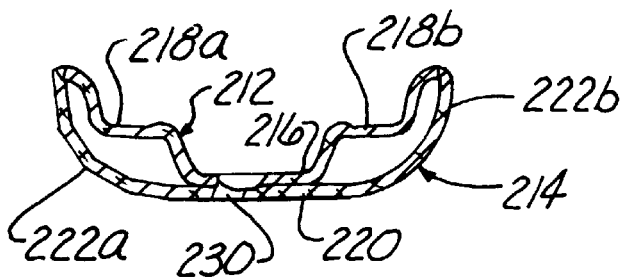
Figure 6E:
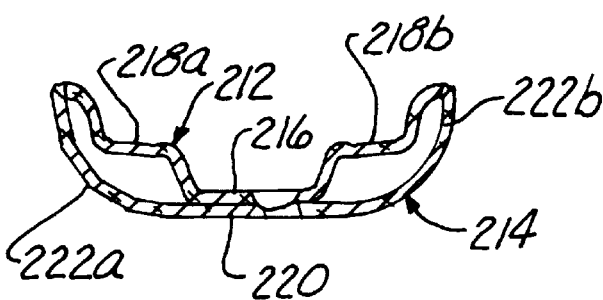

In a preferred embodiment, the wheel rim 10 is formed of either steel or aluminum. The embodiment formed of steel is illustrated in FIGS. 2–4 wherein 100-series numbers are used to identify the components corresponding to those used above with respect to FIG. 1. The embodiment formed of aluminum is illustrated in FIGS. 5 and 6 wherein 200-series numbers are used to identify the components corresponding to those used above with respect to FIG. 1.

Sheet stock for the first wheel section 112 or 212 is cut to length and width and the mill scale is removed. The rectangular piece of stock is then rolled so that the longitudinally opposite end edges are brought into contact engagement and butt welded together to form a narrow cylinder. The weld and edges are trimmed. The cylinder is then roll-formed to flare the ends of the cylinder. The specific contour of the first wheel section 112 or 212 is roll-formed in a plurality of steps, resulting in the base 116 or 216 and the support flanges 118a and 118b or 218a and 218b, respectively. The first wheel section 112 or 212 is then sized.

Figure 8:
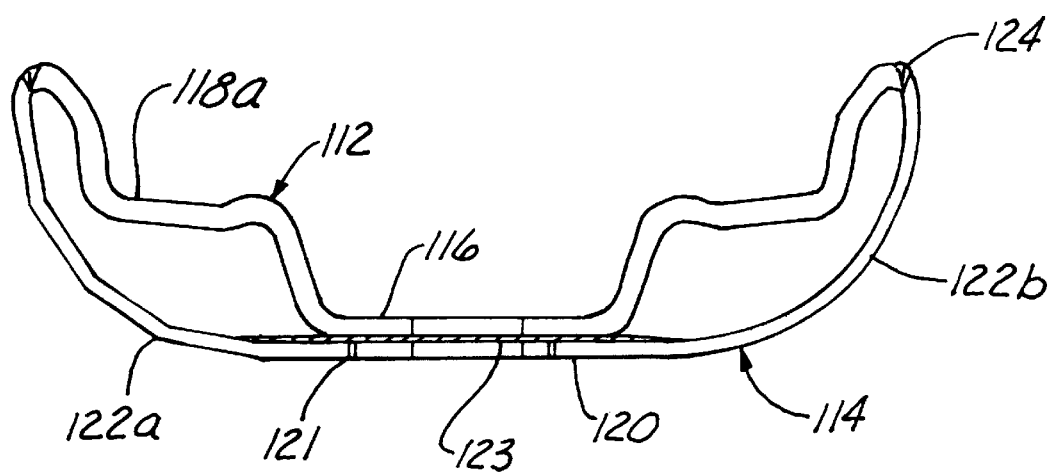

Sheet steel stock for the second wheel section 114, or aluminum sheet stock for the second wheel section 214, is cut to length and width and the mill scale is removed. The rectangular piece of stock is then rolled so that the longitudinally opposite end edges are brought into contact engagement and butt welded together to form a narrow cylinder. The weld and edges are trimmed and the cylinder is sized and made round. Plug holes 121 (see FIG. 8) are punched through the second wheel section 114 or 214 and adlhesive or sealant 123 is is applied around the periphery of the second wheel rim section 114 or 214. The second wheel rim section 114 or 214 is then coaxialy aligned with the first wheel rim section 112 or 212, respectively, then centered axially relative to the first wheel rim section, and the two wheel sections are pressed together and bonded along their interface surfaces by the. The sealant or adlhesive 123 plug holes 121 are welded to secure the two wheel sections together. The ends of the second wheel rim section 114 or 214 are then flared by roll-forming to form the flanges 122a and 122b or 222a and 222b, respectively, to bring them into contact with the ends of the corresponding flanges of the first wheel rim section 112 or 212 and to provide the second wheel rim section with the desired, distinct contour. Using a full circle weld on both sides, the outer peripheral edges of the flanges of the two wheel sections are joined together to create the composite wheel rim. The wheel rim is finished by cosmetic machining of the flanges to clean up the welds, spoke holes are drilled and countersunk, and the wheel is polished and chrome plated.

The wheel rims 110 and 210 are wheel rims for motorcycle tires and accordingly have been drilled to produce passageways 30 for spokes. In the case of the aluminum wheel rim 210, the spoke passageways are countersunk at 32 to receive a fastener for the spoke. While the preferred embodiments described in the specification are wheel rims for motorcycles, the wheel rims of the present invention may be used with virtually any type of tire or wheel structure suitable for use with conventional wheel rims.

Figure 7:
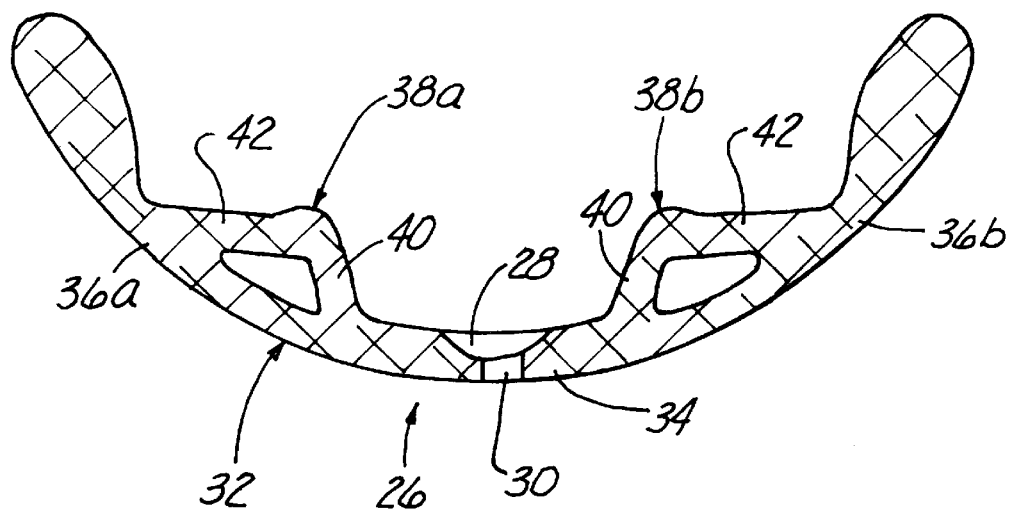
FIG. 7 is a cross sectional view of an extrusion that is used in manufacturing an alternative embodiment of the wheel rim of the present invention.

In a third preferred embodiment of the invention, the composite wheel rim 10 is formed of an aluminum extrusion. An extrusion 26 having a cross section as illustrated in FIG. 7 is cut to length and coiled to bring the longitudinally opposite end edges into contact engagement. The edges are then butt welded together and the welds and edges trimmed. The wheel rim is then roll-formed to ensure that it is round. Cosmetic machining is performed to remove any burrs or other irregularities and the wheel rim is sized. Spoke holes 30 are drilled and countersunk 28 and the wheel is polished and chrome plated. The resulting wheel rim is that illustrated in FIG. 1 at 10. As best illustrated in FIG. 7, the cross section of the extrusion 26 results in a wheel rim that has both an inner contour corresponding generally to the inner contour, of the steel and aluminum wheel rims 110 and 210, respectively, and an outer contour corresponding generally to the outer contour, of the steel and aluminum wheel rims 110 and 210, respectively. The wheel rim 10 formed of the extrusion, accordingly, has a double-wall design similar in function and appearance to the composite wheel rims 110 and 210 formed by roll-forming. Specifically, the extrusion 26 has a wall section 32 including a central base 34 and a pair of support flanges 36a and 36b at opposite sides of the base 34, each of which curves axially and radially outwardly. On the inside of the extrusion 26, a pair of support flanges 38 a and 38b are positioned at either side of the central base 34. Each support flange 38a and 38b include a radially extended first section 40 and an axially extended second section 42 that extends from the outer end portion of the first section 40 axially outwardly to the adjacent support flange 36a or 36b.

The composite wheel rims 110 and 210 are formed of standard sheet stock material using roll-forming machines that are used in forming conventional wheel rims. The resulting composite wheel rims are heavier and have increased strength due to their effectively double-wall construction. Conventional wheel rims with the same strength would need to be roll-formed out of much heavier sheet stock which may require the use of different, stronger and more expensive roll-forming machines and/or different tooling. Another advantage of the wheel rims of the present invention is that they allow for the creation of wheel rims having a distinct contour on the outside or visible part of the wheel rim when a tire is mounted on the wheel rim. While functional requirements dictate the essential contour of the inner part of the wheel rim, the wheel rims of the present invention can have a wide variety of outer contours to produce wheel rims from standard sheet stock that have any of a variety of appearances relatively unrestricted by the constraints of the inner contour.

Although the invention has been described with respect to a preferred embodiment thereof, it is to be also understood that it is not to be so limited since changes and modifications can be made therein which are within the full intended scope of this invention as defined by the appended claims.

What is claimed is:

1. A two piece free standing spoked wheel rim comprising:
    (a) a first free standing wheel rim piece having a base and a pair of circumferential support flanges at opposite sides of said base, each of which extends radially outwardly from said base;
    (b) a second free standing wheel rim piece having a base and a pair of circumferential support flanges at opposite sides of said base, each of which curves axially and radially outwardly;
    (c) said second wheel rim piece is placed inside said first wheel rim piece with said bases of said first and said second wheel rim pieces in contact engagement;
    (d) said outer peripheral edges of said flanges of said first and said second wheel rim pieces meet along the circumference of the wheel rim;
    (e) wherein said outer peripheral edges of said flanges of said first and said second wheel rim pieces are welded to each other along the circumference of the wheel rim;
    (f) a plurality of countersunk depressions formed in said bases; and
    (g) a throughbore formed in each of said depressions for receiving a spoke.

2. A wheel rim as defined in claim 1, wherein said first wheel rim section has an inner contour and said second wheel rim section has an outer contour that is distinct from said inner contour.

3. A method of forming a two piece free standing spoked wheel rim, comprising the steps of:
    (a) forming from sheet stock a first free standing wheel rim piece having a base and a pair of circumferential support flanges at opposite sides of said base, each of which extends radially outwardly from said base;
    (b) forming from sheet stock a cylindrical second free standing wheel rim piece;

(c) placing said cylindrical second wheel rim piece inside said first wheel rim piece with said base of said first wheel rim piece in contact engagement centrally of said cylindrical second wheel piece;

(d) forming a pair of circumferential support flanges at opposite sides of said cylindrical second wheel rim piece, each of which curves axially and radially outwardly such that said outer peripheral edges of said flanges of said first and said second wheel rim pieces meet along the circumference of the wheel rim;

(e) welding said outer peripheral edges of said flanges of said first and said second wheel rim sections to each other along the circumference of the wheel rim;

(f) forming a plurality of countersunk depressions formed in said bases; and (g) forming a throughbore formed in each of said depressions for receiving a spoke.

* * * * *